(12) United States Patent
Torii et al.

(10) Patent No.: US 6,700,269 B2
(45) Date of Patent: Mar. 2, 2004

(54) DIRECT CURRENT MOTOR YOKE HOUSING HAVING GROOVE-LIKE REDUCED THICKNESS PORTIONS

(75) Inventors: Katsuhiko Torii, Hamamatsu (JP); Kengo Yamamura, Inasa-gun (JP); Hiroaki Yamamoto, Kosai (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/842,731

(22) Filed: Apr. 27, 2001

(65) Prior Publication Data

US 2002/0047381 A1 Apr. 25, 2002

(30) Foreign Application Priority Data

May 10, 2000 (JP) .................................. 2000-137633

(51) Int. Cl.[7] .................. H02K 21/26; H02K 21/38; H02K 23/04; H02K 21/00; H02K 21/22
(52) U.S. Cl. .................. 310/154.08; 310/154.03; 310/154.01; 310/152
(58) Field of Search ............ 310/154.01, 154.03, 310/154.08, 152, 40 R, 10

(56) References Cited

U.S. PATENT DOCUMENTS

| 3,401,282 | A | * | 9/1968 | Zagorski ..................... 310/42 |
|---|---|---|---|---|
| 3,422,295 | A | | 1/1969 | Parker |
| 4,071,794 | A | * | 1/1978 | Schoen ................... 310/154.17 |
| 4,163,165 | A | * | 7/1979 | Purdy ..................... 310/154.08 |
| 4,334,163 | A | * | 6/1982 | Ascoli ......................... 310/90 |
| 4,547,687 | A | * | 10/1985 | Arai ........................... 310/58 |
| 4,682,066 | A | | 7/1987 | Abbratozzato et al. ..... 310/154 |
| 4,795,932 | A | | 1/1989 | Long .......................... 310/154 |
| 4,933,582 | A | * | 6/1990 | Hata et al. ............. 310/154.14 |
| 4,973,871 | A | | 11/1990 | Bisantz ..................... 310/154 |
| 5,008,578 | A | | 4/1991 | Pace .......................... 310/256 |
| 5,175,460 | A | | 12/1992 | Ishizuka .................... 310/154 |
| 5,497,039 | A | * | 3/1996 | Blaettner et al. ............. 310/51 |
| 6,515,389 | B1 | * | 2/2003 | Hartz .................... 310/154.08 |

FOREIGN PATENT DOCUMENTS

| DE | 19808550 | 7/1999 |
|---|---|---|
| EP | A-11-133549 | 5/1989 |
| FR | 2213611 | 8/1974 |
| GB | 2111763 | 7/1983 |
| JP | 57-139283 | 8/1982 |

\* cited by examiner

*Primary Examiner*—Thomas M. Dougherty
*Assistant Examiner*—Pedro J. Cuevas
(74) *Attorney, Agent, or Firm*—Posz & Bethards, PLC

(57) ABSTRACT

A yoke housing that receives an armature has a plurality of permanent magnets (primary magnetic poles) secured to an inner peripheral surface of the yoke housing. Furthermore, the yoke housing includes a plurality of groove-like reduced thickness portions for increasing a magnetic resistance. Each reduced thickness portion extends along a center line of a corresponding one of the permanent magnets.

22 Claims, 9 Drawing Sheets

DIRECT CURRENT MOTOR YOKE HOUSING HAVING GROOVE-LIKE REDUCED THICKNESS PORTIONS

CROSS REFERENCE TO RELATED APPLICATION

This application is based on and incorporates herein by reference Japanese Patent Application No. 2000-137633 filed on May 10, 2000.

BACKGROUND OF THE INVENTION

1. Field of the Invention

The present invention relates to a direct current motor, a yoke housing of the direct current motor, and a manufacturing method of the yoke housing.

2. Description of Related Art

In a direct current motor, when an electric current is applied to armature coils of the motor, a magnetic flux is generated due to an armature magnetomotive force. This magnetic flux influences a magnetic flux of permanent magnets (primary magnetic poles) and causes a phenomenon of so called "armature reaction". When the armature reaction is excessively large, a spatial magnetic flux distribution is greatly distorted, causing displacement of an electrically neutral axis in the motor. Thus, a magnetic flux density in a commutating zone becomes far apart from zero, inducing many problems, such as generation of sparks, a reduction in an output power of the motor due to a reduction in a magnetic flux of the primary magnetic poles, or the like.

One way of solving the above-described disadvantages is disclosed, for example, in Japanese Unexamined Utility Model Publication No. 57-139283.

A yoke housing of a motor disclosed in this publication has notches that penetrate through a wall of the yoke housing at predetermined positions. The notches are formed such that notches provide a large magnetic resistance only to a magnetic flux induced by an armature magnetomotive force without influencing a magnetic flux of magnets (primary magnetic poles). Thus, by providing such a notch, only the magnetic flux induced by the armature magnetomotive force is reduced without influencing the magnetic flux of the primary magnetic poles, so that the armature reaction is restrained.

Furthermore, in the motor disclosed in this publication, in order to prevent intrusion of foreign matter, such as water, dust or the like, into an interior of the yoke housing through the notches, an arrowhead-shaped non-magnetic member is plugged into each notch of the yoke housing, or alternatively a cylindrical non-magnetic frame is secured around the yoke housing to surrounds the entire yoke housing including the notches.

In the motor disclosed in the above publication, the arrowhead-shaped non-magnetic member, the cylindrical non-magnetic frame member, or the like is required to prevent the intrusion of the foreign matter into the interior of the yoke housing through the notches. Thus, a cost of such a non-magnetic member is added, and an assembling step for assembling such a non-magnetic member is also added. Thus, disadvantageously, this results in an increase in a cost of the yoke housing, and thereby a cost of the motor.

SUMMARY OF THE INVENTION

The present invention addresses the above described disadvantages. Thus, it is an objective of the present invention to provide a yoke housing of a direct current motor capable of restraining armature reaction without exerting a substantial influence on a magnetic flux of primary magnetic poles and also capable of preventing intrusion of foreign matter into an interior of the yoke housing without necessitating a specialized separate member. It is another objective of the present invention to provide a direct current motor having such a yoke housing. It is a further objective of the present invention to provide a manufacturing method of such a yoke housing.

To achieve the objectives of the present invention, there is provided a direct current motor comprising a yoke housing and an armature rotatably received within the yoke housing. The yoke housing has a plurality of primary magnetic poles secured to an inner peripheral surface of the yoke housing for providing magnetic fields to the armature. The yoke housing also includes a plurality of groove-like reduced thickness portions for increasing a magnetic resistance. The plurality of groove-like reduced thickness portions are integrally formed in the yoke housing. A number of the plurality of groove-like reduced thickness portions is equal to a number of the plurality of primary magnetic poles. Each groove-like reduced thickness portion extends along a center line of a corresponding one of the plurality of primary magnetic poles.

There is also provided a method for manufacturing the yoke housing of the direct current motor. The method includes forming the plurality of groove-like reduced thickness portions in the yoke housing by pressing a die along a surface of the yoke housing in a direction axially parallel to the yoke housing, the die being also used for forming at least a portion of a rest of the yoke housing.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A geared motor used in a vehicle power window system according to a first embodiment of the present invention will be described with reference to the accompanying drawings.

Figure 1:
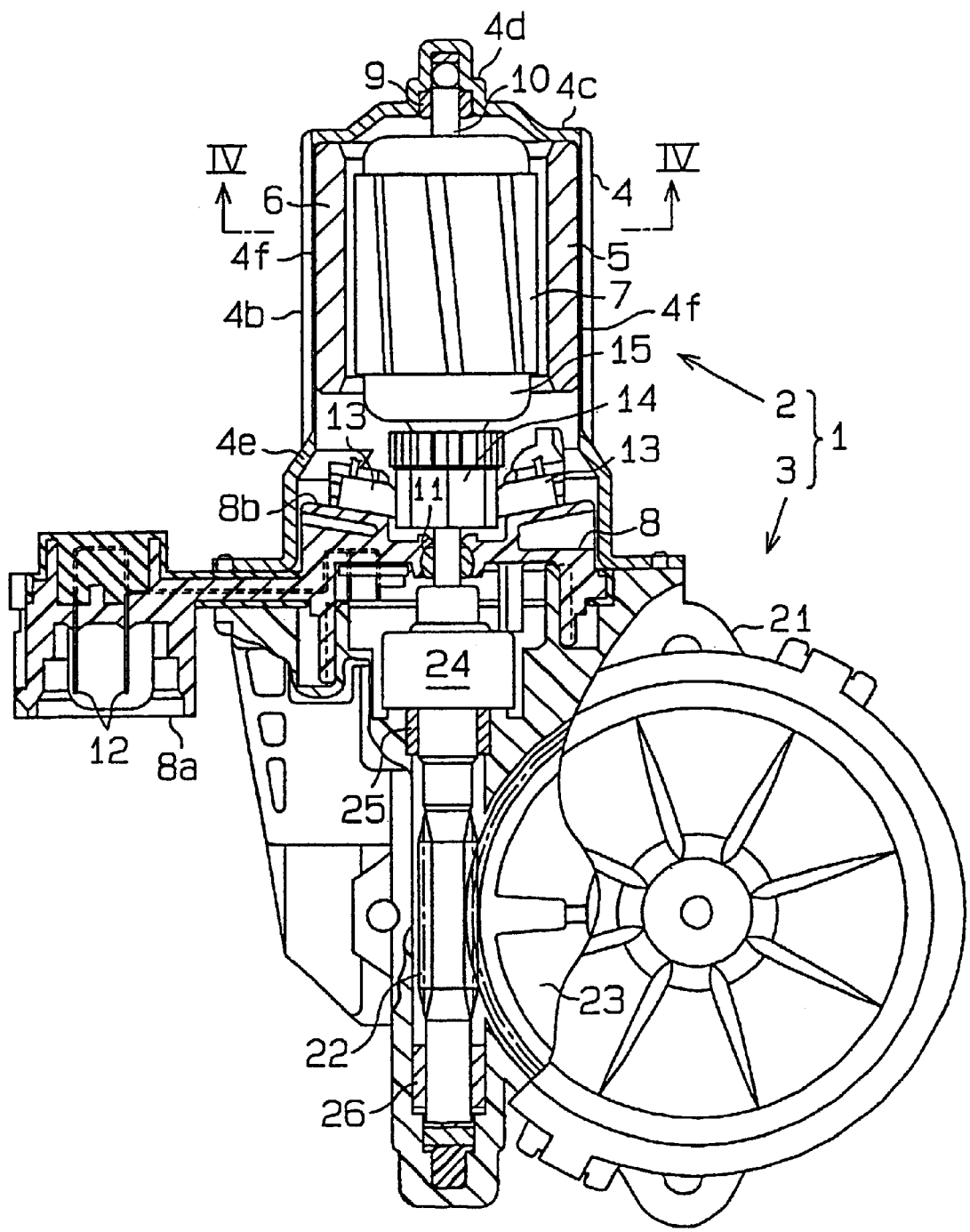
FIG. 1 is a cross-sectional view of a geared motor according to a first embodiment of the present invention.
Figure 2:
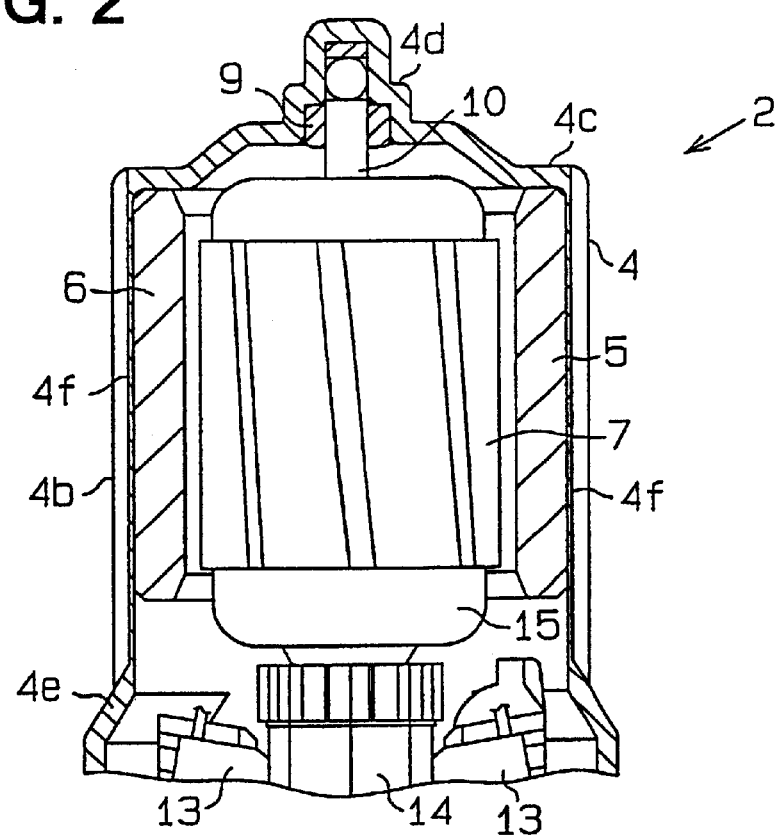
FIG. 2 is a cross-sectional view of a motor main body according to the first embodiment.

As shown in FIG. 1, the geared motor 1 includes a motor main body 2 and a speed reducing arrangement 3. The motor main body 2 includes a yoke housing 4, a couple of permanent magnets 5, 6, an armature 7 and a power supplying arrangement 8.

Figure 3:
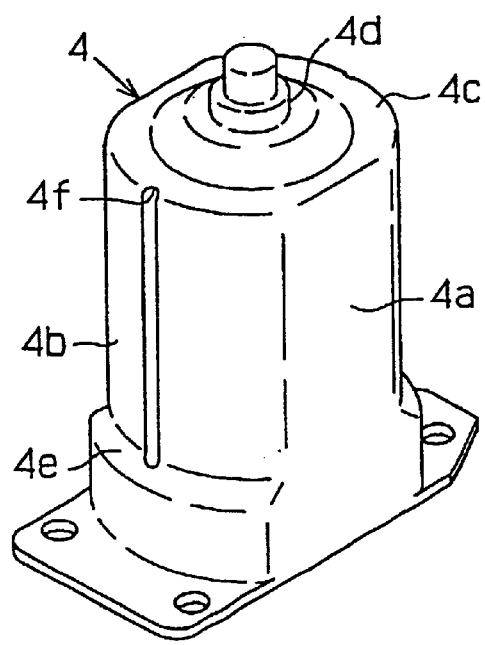
FIG. 3 is a perspective view of a yoke housing according to the first embodiment.
Figure 4:
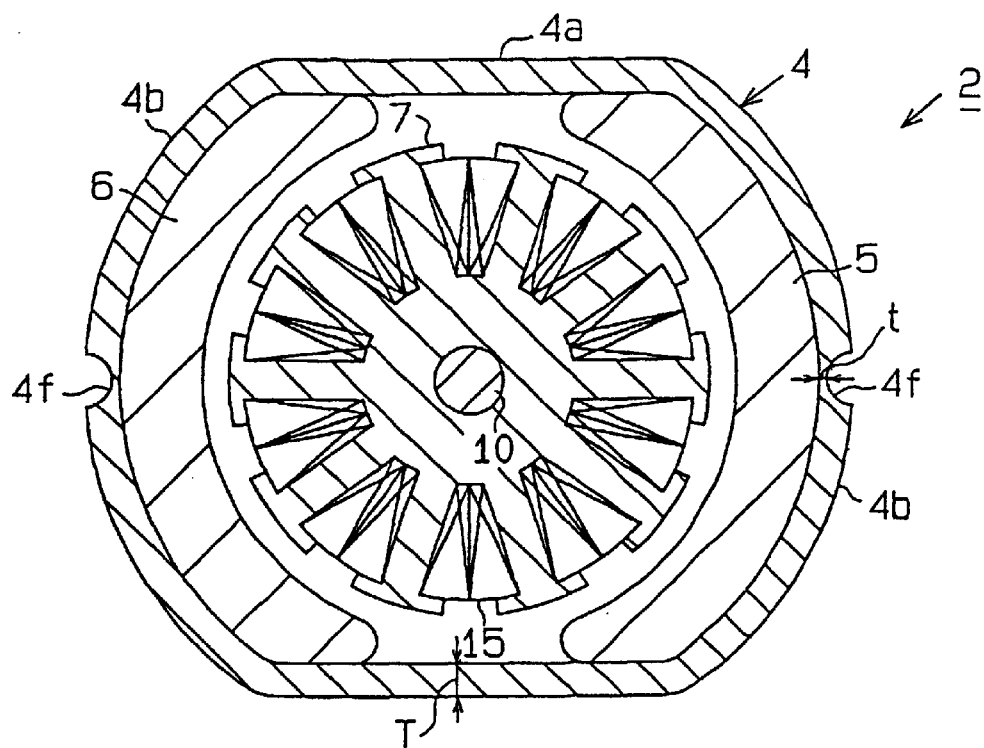
FIG. 4 is a cross-sectional view along line IV—IV in FIG. 1.

As shown in FIGS. 3 and 4, the yoke housing 4 is formed as a generally oblate cylindrical cup shaped body having a couple of generally parallel flat sections 4a and a couple of arcuate sections 4b. Each arcuate section 4b connects opposing lateral ends of the flat sections 4a. Each permanent magnet 5 or 6 has an arcuate cross-section and extends linearly in an axial direction of the yoke housing 4. Furthermore, each permanent magnet 5 or 6 is secured to an inner surface of the corresponding arcuate section 4b of the yoke housing 4, so that the permanent magnets 5 and 6 are diametrically opposed to one another. A bearing receiving recess 4d is formed in a center of a base section 4c of the yoke housing 4. A bearing 9 is secured to the bearing receiving recess 4d. The bearing 9 rotatably supports a base end of a rotatable shaft 10 of the armature 7.

Also, as shown in FIGS. 1–4, a groove-like reduced thickness portion 4f is formed at a circumferential center of an outer surface of each arcuate section 4b of the yoke housing 4. The reduced thickness portion 4f extends linearly between the base section 4c and a step portion 4e that is bent outwardly from the arcuate section 4b. Specifically, each reduced thickness portion 4f extends along a central line (geometrical neutral axis) of the corresponding permanent magnet 5 or 6 (primary magnetic pole) and has an axial length longer than that of the corresponding permanent magnet 5 or 6. A circumferential width of the reduced thickness portion 4f is selected based on a size of the motor main body 2. This is due to the following reason. That is, if the circumferential width of the reduced thickness portion 4f is excessively large, an effective magnetic flux of the motor main body 2 is reduced, causing a large influence on an output of the motor main body 2. Each reduced thickness portion 4f is formed by recessing a corresponding portion of the outer surface of the respective arcuate section 4b of the yoke housing 4. The reduced thickness portion 4f is provided for increasing the magnetic resistance in that portion in comparison to the rest of the arcuate section 4b.

Figure 6:
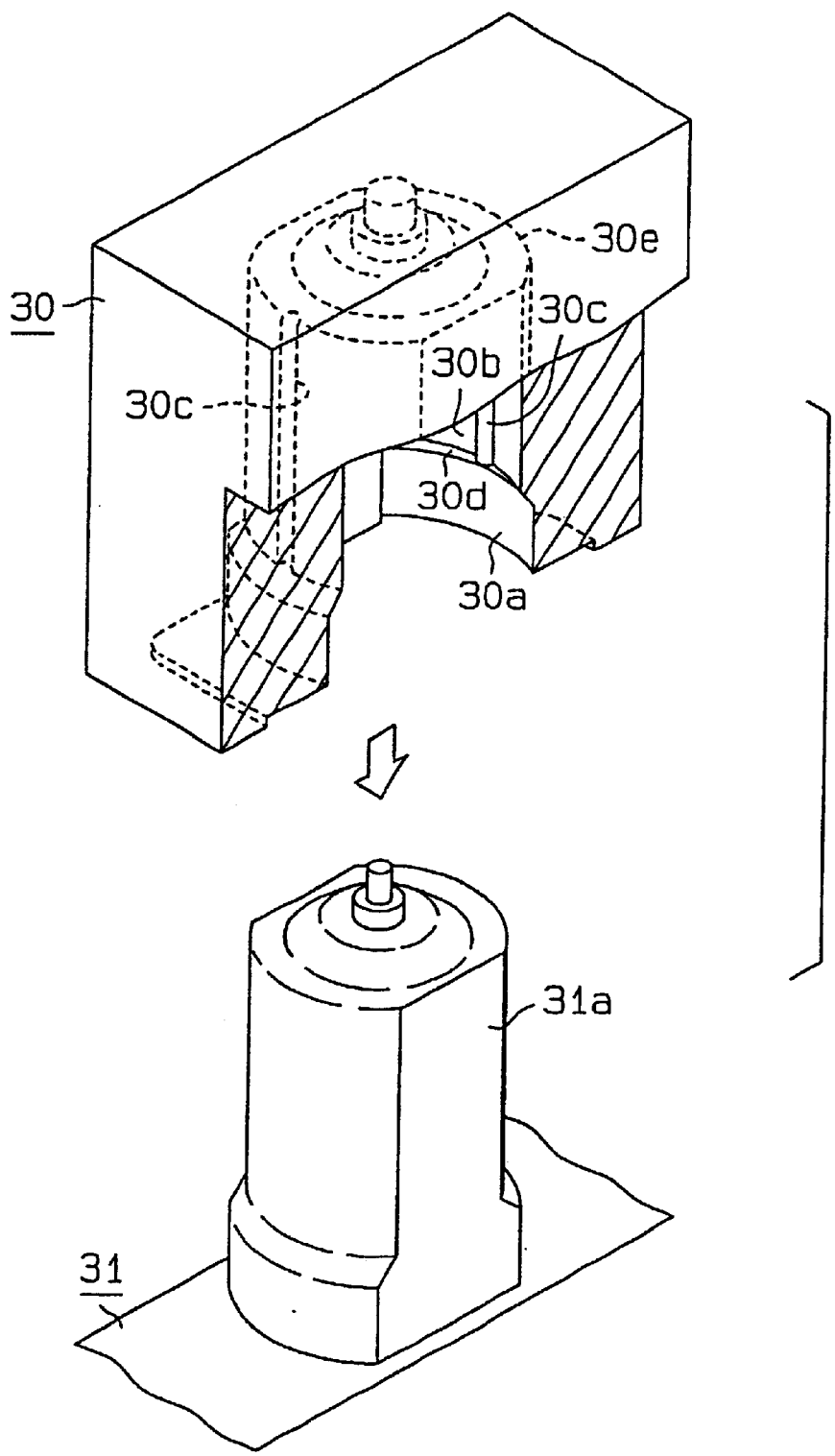
FIG. 6 is a perspective view of dies used in press working of the yoke housing according to the first embodiment.

The yoke housing 4 is formed by press working (drawing) in a press machine (not shown) using a pair of upper and lower dies 30, 31 shown in FIG. 6. The yoke housing 4 is not formed through a single pressing step of a plate material using the dies 30 and 31. Rather, the yoke housing 4 is formed through a plurality of pressing steps of the plate material using more than two dies, and the dies 30 and 31 shown in FIG. 6 are only two of them. The upper die 30 is supported in such a manner that the upper die 30 is linearly movable relative to the lower die 31 in a vertical direction. During the press working, the upper die 30 is pressed against the lower die 31 with a predetermined pressure.

The lower die 31 includes an inner surface shaping protrusion 31a for shaping an inner surface of the yoke housing 4. The upper die 30 includes an outer surface shaping recess 30a for shaping an outer surface of the yoke housing 4. The outer surface shaping recess 30a includes arcuate section shaping surfaces 30b for shaping the arcuate sections 4b of the yoke housing 4. Furthermore, in a circumferential center of each arcuate section shaping surface 30b, there is formed a reduced thickness portion shaping protrusion 30c for shaping the corresponding reduced thickness portion 4f by recessing the corresponding portion of the outer surface of the arcuate section 4b. The reduced thickness portion shaping protrusion 30c extends linearly along the arcuate section shaping surface 30b in the axial direction between a step portion shaping surface 30d side end and a base section shaping surface 30e side end. When the upper die 30 is pressed against the lower die 31 with the predetermined pressure, the inner and outer surfaces of the yoke housing 4 are formed or shaped, and the reduced thickness portions 4f are also simultaneously formed to extend linearly from the base section 4c in the axial direction, as shown in FIG. 3. Thus, the reduced thickness portions 4f are formed in the yoke housing 4 by pressing the upper die 30, which is also used for forming at least a portion of the rest of the yoke housing 4, along the surface of the yoke housing 4 in a direction axially parallel to the yoke housing 4.

Specifically, the yoke housing 4 of the present embodiment is formed such that each reduced thickness portion 4f extends continuously from the base section 4c. That is, each reduced thickness portion 4f extends from a base section 4c side end of the outer surface of the corresponding arcuate section 4b in the axial direction, so that the recess of the reduced thickness portion 4f is visible from one side (top side in FIG. 3) of the axial direction. In other words, each reduced thickness portion 4f extends from one axial end of the yoke housing 4 for a length that covers an entire axial length of the corresponding one of the primary magnetic poles 5 and 6. As described above, each reduced thickness portion 4f is simultaneously formed together with the outer and inner surfaces of the yoke housing 4 using the above-described dies 30 and 31. Thus, in accordance with the present embodiment, there is no need to provide a specialized separate manufacturing step or a specialized separate die to form only the reduced thickness portions 4f, and it is only additionally required to provide the reduced thickness portion shaping protrusions 30c in the upper die 30. Since the reduced thickness portions 4f are formed by the simple axial movement of the upper die 30, a control operation of the press machine is not complicated, and an entire press working time is not increased.

As shown in FIG. 1, a distal end of the rotatable shaft 10 of the armature 7 is rotatably supported by a bearing 11 provided in the power supply arrangement 8 received in an open end of the yoke housing 4. The power supply arrangement 8 has a connector portion 8a and a brush holding portion 8b. The connector portion 8a is connected with an external connector which is, in turn, connected to a controller (not shown) for controlling the geared motor 1. The brush holding portion 8b holds brushes 13 electrically connected to a terminal 12 provided in the connector portion 8a.

A commutator 14 is secured around a portion of the rotatable shaft 10 which is opposed to the brushes 13. The armature coils 15 are connected to the commutator 14. Furthermore, the brushes 13 slidably contact the commutator 14 to supply electricity to the commutator 14.

The speed reducing arrangement 3 includes a gear housing 21, a worm shaft 22, a worm wheel 23 and a clutch 24.

The gear housing 21 is made of a synthetic resin material and has a predetermined shape to receive the worm shaft 22, the worm wheel 23 and the clutch 24. Furthermore, the gear housing 21 is securely connected to the yoke housing 4, for example, with screws. The power supply arrangement 8 is clamped between the gear housing 21 and the yoke housing 4.

The worm shaft 22 is rotatably supported by bearings 25 and 26 arranged in predetermined positions within the gear housing 21. The worm shaft 22 is drivingly coupled to the rotatable shaft 10, which extends from the motor main body 2, via the clutch 24. The clutch 24 transmits a driving force from the rotatable shaft 10 to the worm shaft 22 but prevents transmission of a driving force from the worm shaft 22 to the rotatable shaft 10 by locking rotation of the worm shaft 22.

The worm shaft 22 is meshed with the worm wheel 23 which is, in turn, drivingly coupled with an output shaft (not shown) extending in a direction perpendicular to the worm shaft 22. The output shaft is drivingly coupled with an X-armed regulator of a known power window system.

When the rotatable shaft 10 of the motor main body 2 is driven to rotate, a driving force of the rotatable shaft 10 is transmitted to the worm shaft 22 via the clutch 24. Then, the driving force is transmitted from the worm shaft 22 to the worm wheel 23 and then to the output shaft to operate the X-armed regulator, so that a vehicle window glass (not shown) is moved upward or downward.

When the driving force or load is exerted on the output shaft by a weight of the window glass or by an external force that forces the window glass downward, this driving force exerted on the output shaft is transmitted to the clutch 24 through the worm wheel 23 and the worm shaft 22. However, when this driving force is transmitted to the clutch 24, the clutch 24 locks the worm shaft 22. Thus, the window glass is prevented from moving downward upon application of the weight of the window glass or the external force.

Figure 5:
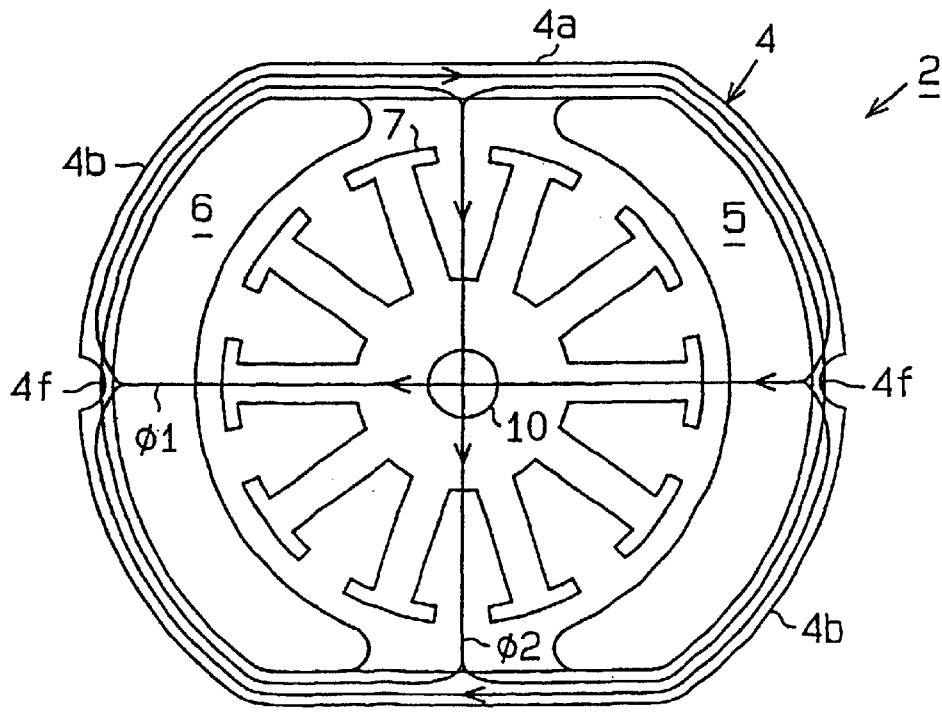
FIG. 5 is a schematic cross-sectional view, indicating passages of magnetic fluxes generated in the cross-section in FIG. 4.

Operation of the thus constructed geared motor 1 (motor main body 2) will be described with reference to FIG. 5. FIG. 5 shows passages (magnetic circuits) of magnetic fluxes in a cross-section shown in FIG. 4 but does not show the armature coils 15 for simplicity.

As shown in FIG. 5, a magnetic flux $\Phi 1$ of the permanent magnets 5 and 6 (primary magnetic poles) flows from the permanent magnet 5 (N pole) to the permanent magnet 6 (S pole) along a center line that connects between a circumferential center of the permanent magnet 5 to a circumferential center of the permanent magnet 6. Then, the magnetic flux $\Phi 1$ of the permanent magnets 5 and 6 branches off left and right at a center of the rear surface of the permanent magnet 6 (securing surface between the arcuate section 4b of the yoke housing 4 and the permanent magnet 6). Then, the branched portions of the magnetic flux $\Phi 1$ flow through the yoke housing 4 (flat sections 4a) toward the permanent magnet 5 and merge each other at a center of the rear surface of the permanent magnet 5 to return to the permanent magnet 5 (N pole). Since a magnetic flux density of the magnetic flux $\Phi 1$ of the permanent magnets 5 and 6 (primary magnetic poles) is very small at each reduced thickness portion 4f, the reduced thickness portion 4f does not provide a substantial magnetic resistance to the magnetic flux $\Phi 1$, so that the magnetic flux $\Phi 1$, i.e., the effective magnetic flux of the motor main body 2 is not substantially reduced by the reduced thickness portions 4f.

When the electric current is applied to the armature coils 15, an armature magnetomotive force (cross-magnetomotive force) is generated. A magnetic flux $\Phi 2$ induced by the armature magnetomotive force flows along a center line that connects between centers of the opposing flat sections 4a toward the one flat section 4a located at the bottom side in FIG. 5 and branches off left and right at the center of the same flat section 4a. Then, the branched portions of the magnetic flux $\Phi 2$ flow through the yoke housing 4 (arcuate sections 4b) and merge each other at the center of the other flat section 4a located at the top side in FIG. 5 to return to the armature 7. Thus, the magnetic flux $\Phi 2$ induced by the armature magnetomotive force passes through the reduced thickness portions 4f, i.e., the magnetic resistance enhanced portions provided in the arcuate sections 4b. As a result, the magnetic flux $\Phi 2$ is reduced.

FIG. 5 shows the passage of the magnetic flux $\Phi 2$ that is generated when the armature 7 is rotated forward. Although the magnetic flux $\Phi 2$ that is generated when the armature 7 is rotated backward is not shown, this magnetic flux $\Phi 2$ differs from one shown in FIG. 5 only in the direction of the flow of the magnetic flux $\Phi 2$ (i.e., flowing in the opposite direction). Thus, the magnetic flux $\Phi 2$ is also reduced when the armature 7 is rotated backward.

Figure 7:
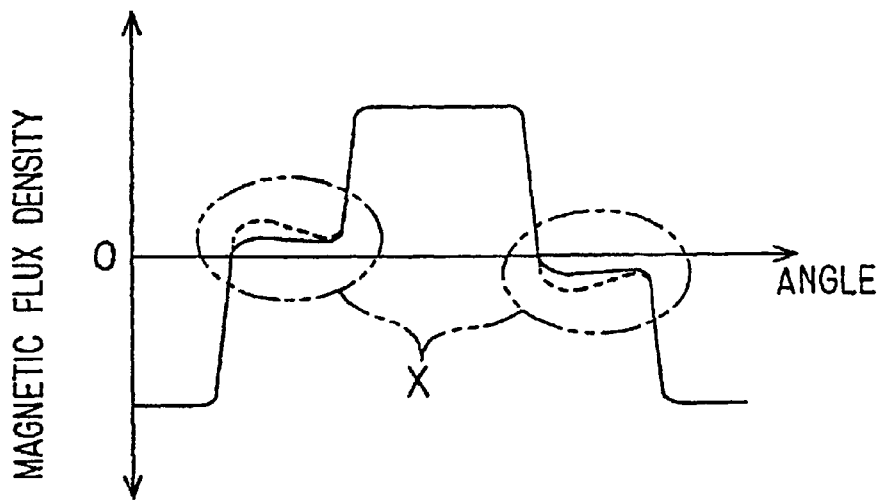
FIG. 7 is a diagram showing a magnetic flux distribution of the motor.

Furthermore, as is obvious from a magnetic flux distribution diagram of the motor 1 shown in FIG. 7, a magnetic flux density in each commutating zone X (indicated with a dot—dot dash line in FIG. 7) of the motor 1 according to the present embodiment is closer to "zero" than that of a motor having no reduced thickness portion 4f (indicated with a dotted line in FIG. 7). That is, as is well known in the art, if the magnetic flux density in the commutating zone X is closer to "zero", the armature reaction is smaller. Thus, in the motor 1 according to the present embodiment, the armature reaction is advantageously reduced.

Figure 8:
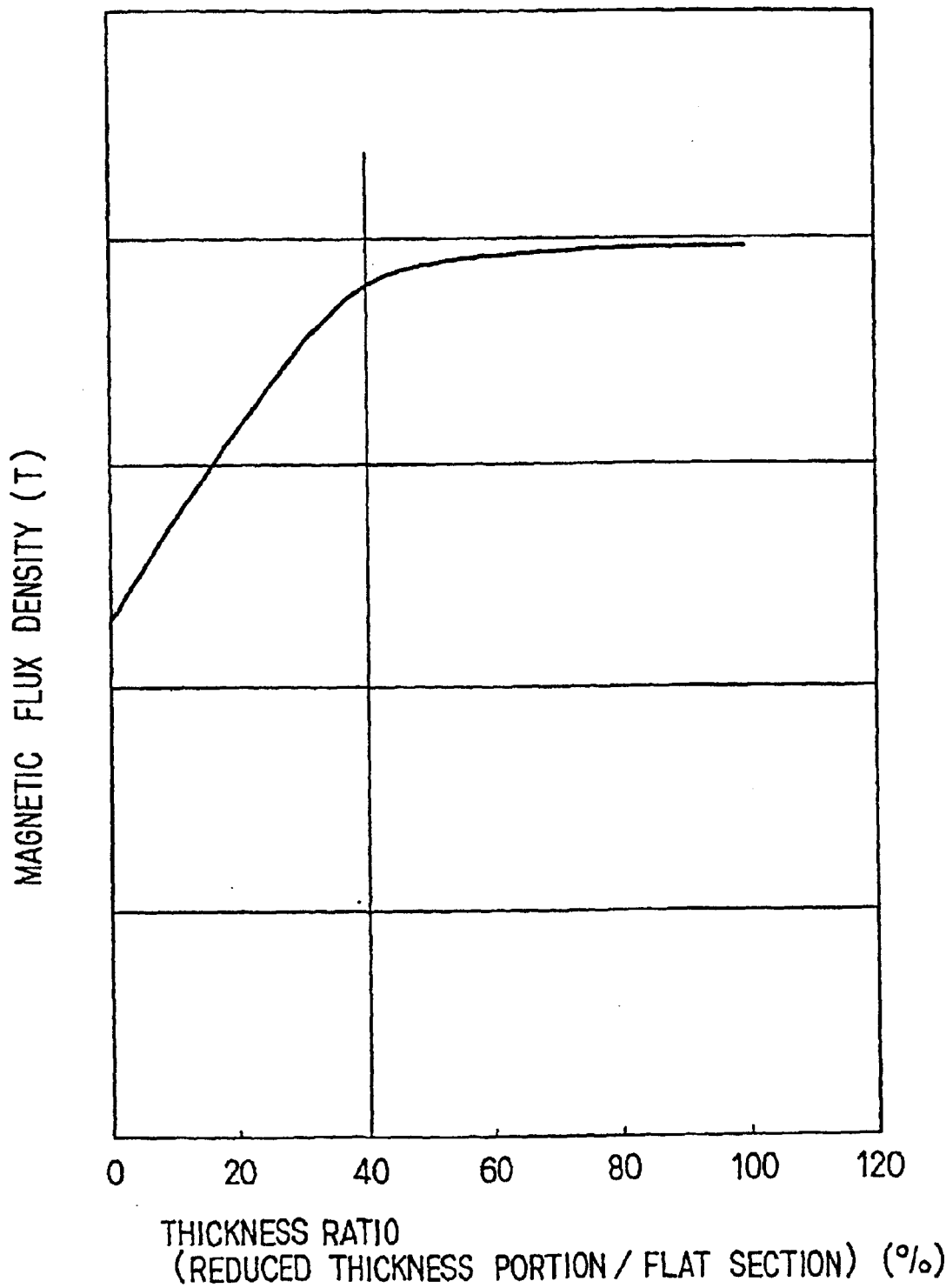
FIG. 8 is a graph showing a relationship between a magnetic flux density and a thickness ratio of the yoke housing.

With reference to FIGS. 4 and 8, when the wall thickness t of the reduced thickness portion 4f formed in each arcuate section 4b is equal to or less than 40% of the wall thickness T of each flat section 4a, the magnetic flux density in the commutating zone X can be substantially reduced.

Furthermore, in the present embodiment, each magnetic resistance enhanced portion that reduces the armature reaction is constructed as the reduced thickness portion 4f that is manufactured in the press working of the yoke housing 4, which is carried out to form or shape at least a portion of the rest of the yoke housing 4. Thus, in accordance with the present embodiment, there is no need to provide a specialized separate component for implementing the magnetic resistance enhanced portion, and the intrusion of the foreign matter, such as water, dust or the like, into the interior of the yoke housing 4 is advantageously prevented by eliminating a substantial opening, such as the notch required in the prior art, communicated to the interior of the yoke housing 4.

The present embodiment provides the following advantages.

(1) In the yoke housing 4, each reduced thickness portion 4f, which acts as the magnetic resistance enhanced portion, is formed along the center line of the corresponding permanent magnet 5 or 6 (primary magnetic pole). Thus, the magnetic flux $\Phi 2$, which is induced by the armature magnetomotive force, flows through the reduced thickness portion 4f, so that the magnetic resistance against the magnetic flux $\Phi 2$ is increased by the reduced thickness portion 4f. As a result, the magnetic flux $\Phi 2$ induced by the armature magnetomotive force can be advantageously reduced, and thereby reducing the armature reaction. On the other hand, the magnetic flux $\Phi 1$ of the permanent magnets 5 and 6 (primary magnetic poles) does not passes through the reduced thickness portions 4f, so that the magnetic flux $\Phi 1$ is not influenced by the reduced thickness portions 4f. Thus, the output of the geared motor 1 (motor main body 2) is advantageously improved, and the generation of the sparks at the brushes 13 is advantageously restrained.

(2) Each magnetic resistance enhanced portion, which reduces the armature reaction, is constructed as the reduced thickness portion 4f that is produced by reducing the wall thickness of the corresponding portion of the yoke housing 4. Thus, the intrusion of foreign matter into the interior of the yoke housing 4 is prevented without necessitating a specialized separate member by eliminating the opening, such as the notch, communicated to the interior of the yoke housing.

(3) Each reduced thickness portion 4f is formed by recessing only the corresponding portion of the outer surface of the yoke housing 4 (arcuate section 4b). Thus, the processing operation of the reduced thickness portions 4f is still relatively simple. Furthermore, the influence of the reduced thickness portions 4f, which are formed in the outer surface of the yoke housing 4, on the magnetic flux $\Phi 1$ of the permanent magnets 5 and 6 is smaller than that of reduced thickness portions 4g (FIG. 9) formed in the inner surface of the yoke housing 4 (arcuate sections 4b) which will be described in greater detail below. This is due to the fact that the reduced thickness portion 4f formed in the outer surface of the yoke housing 4 of the present embodiment provides less magnetic resistance against the magnetic flux $\Phi 1$ of the permanent magnets 5 and 6 in comparison to the reduced thickness portion 4g formed by recessing a corresponding portion of the inner surface of the yoke housing 4 where the magnetic flux $\Phi 1$ branches off right and left.

(4) The permanent magnets 5 and 6 (primary magnetic poles) linearly extend in the axial direction, and each reduced thickness portion 4f extends linearly along the center line of the corresponding magnetic pole. Thus, the permanent magnets 5 and 6 as well as the reduced thickness portions 4f have simple geometrical shapes and thereby can be easily manufactured.

(5) The yoke housing 4 of the present embodiment is formed such that each reduced thickness portion 4f extends continuously from the base section 4c. That is, each reduced thickness portion 4f extends from a base section 4c side end of the outer surface of the corresponding arcuate section 4b in the axial direction, so that the recess of the reduced thickness portion 4f is visible from at least one side (top side in FIG. 3) of the axial direction. With this arrangement, each reduced thickness portion 4f can be simultaneously formed together with the outer and inner surfaces of the yoke housing 4 using the above-described dies 30 and 31. Thus, in accordance with the present embodiment, there is no need to provide a specialized separate manufacturing step or a specialized separate die to form only the reduced thickness portions 4f, and it is only additionally required to provide the reduced thickness portion shaping protrusions 30c in the upper die 30. Since the reduced thickness portions 4f are formed by the simple vertical movement of the upper die 30, a control operation of the press machine is not complicated, and an entire press working time of the yoke housing is not increased.

(6) The yoke housing 4 is formed as the generally oblate cylindrical body having the opposing generally parallel flat sections 4a and the opposing arcuate sections 4b. Each arcuate section 4b connects opposing lateral ends of the flat sections 4a and supports the corresponding permanent magnet 5 or 6 (primary magnetic pole) on its inner surface. Thus, the yoke housing 4 can contribute to achieve a small size of the geared motor (motor main body 2). Furthermore, an air gap between the flat sections 4a and the armature 7 of the oblate cylindrical yoke housing 4 is smaller than a corresponding air gap of a cylindrical yoke housing (not shown). Thus, the magnetic flux $\Phi 2$ induced by the armature magnetomotive force is more easily generated in the oblate cylindrical yoke housing 4 than in the cylindrical yoke housing. Thus, the armature reaction in the oblate cylindrical yoke housing 4 is generally greater than that of the corresponding cylindrical yoke housing. However, the magnetic flux $\Phi 2$ induced by the armature magnetomotive force is substantially reduced by the reduced thickness portions 4f, so that the armature reaction is also substantially reduced in the oblate cylindrical yoke housing 4. Thus, advantageously, the oblate cylindrical yoke housing 4 is capable of reducing the armature reaction.

(7) Each reduced thickness portion 4f is formed by moving the upper die 30 in press working of the yoke housing 4. Thus, the movement (control operation) of the die 30 is not complicated, and the entire press working time of the yoke housing 4 is not increased.

(8) The reduced thickness portion 4f is simultaneously formed in the press working of the yoke housing 4 using the dies 30 and 31. Thus, there is no need to provide the specialized separate manufacturing step or the specialized separate die to form only the reduced thickness portions 4f.

(Second Embodiment)

A second embodiment of the present invention will be described with reference to the accompanying drawings.

In the first embodiment, each reduced thickness portion 4f is formed by recessing the corresponding portion of the outer surface of the yoke housing 4 (arcuate section 4b). However, the construction of the reduced thickness portion 4f is not limited to this construction.

Figure 9:
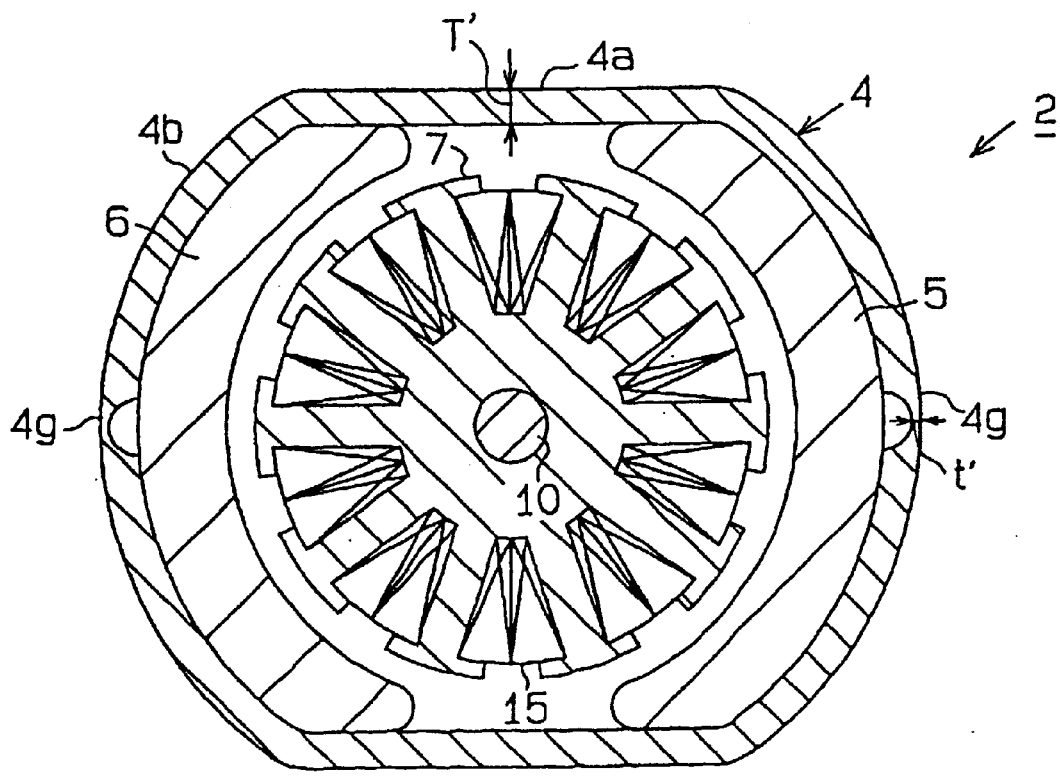
FIG. 9 is a cross-sectional view of a yoke housing similar to FIG. 4 according to a second embodiment of the present invention.
Figure 10:
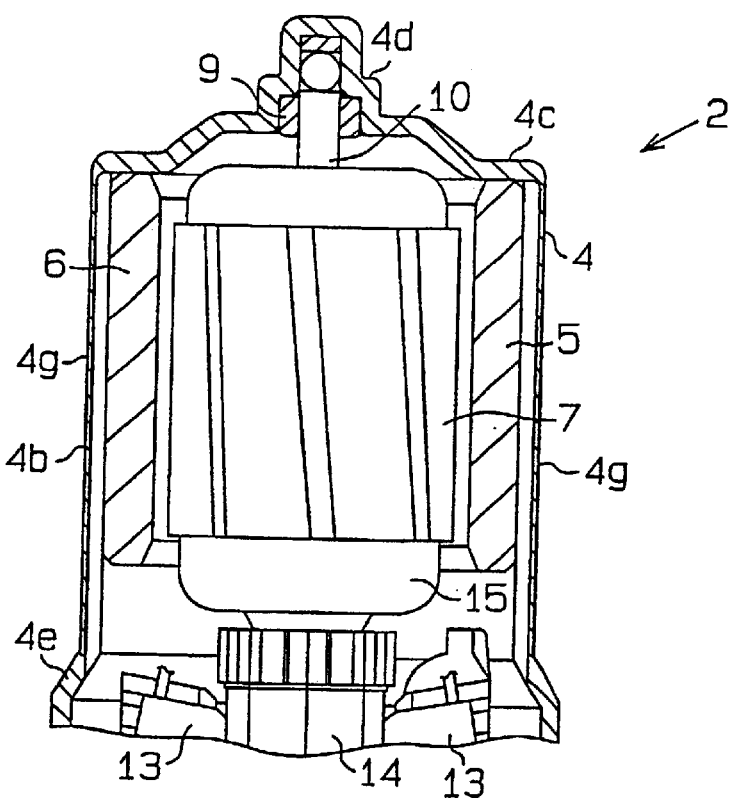
FIG. 10 is a cross-sectional view of a motor main body according to the second embodiment.
Figure 11:
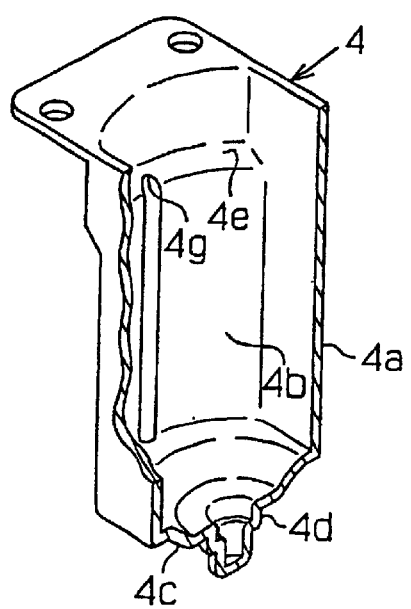
FIG. 11 is a fragmented perspective view of a yoke housing according to the second embodiment.

As shown in FIGS. 9–11, the yoke housing 4 according to the second embodiment has groove-like reduced thickness portions 4g. Each reduced thickness portion 4g has substantially the same shape as that of the reduced thickness portion 4f of the first embodiment but is formed by recessing a corresponding portion of the inner surface of the yoke housing 4 (arcuate section 4b). Each reduced thickness portion 4g extends along the inner surface of the yoke housing 4 between the step portion 4e and the base section 4c. With this arrangement, when each permanent magnet 5 or 6 is secured to the inner surface of the yoke housing 4 by an adhesive material, the adhesive material is applied and is accumulated within each reduced thickness portion 4f, so that each corresponding permanent magnet 5 or 6 is strongly secured by the accumulated adhesive material. Furthermore, if a rust preventive coating needs to be applied to the yoke housing 4 before the formation of the reduced thickness portions 4g, the formation of the reduced thickness portions 4g have a minimum influence on the surface of the yoke housing 4 coated with the rust prevention coating since the reduced thickness portions 4g are formed in the inner surface of the yoke housing 4.

Figure 12:
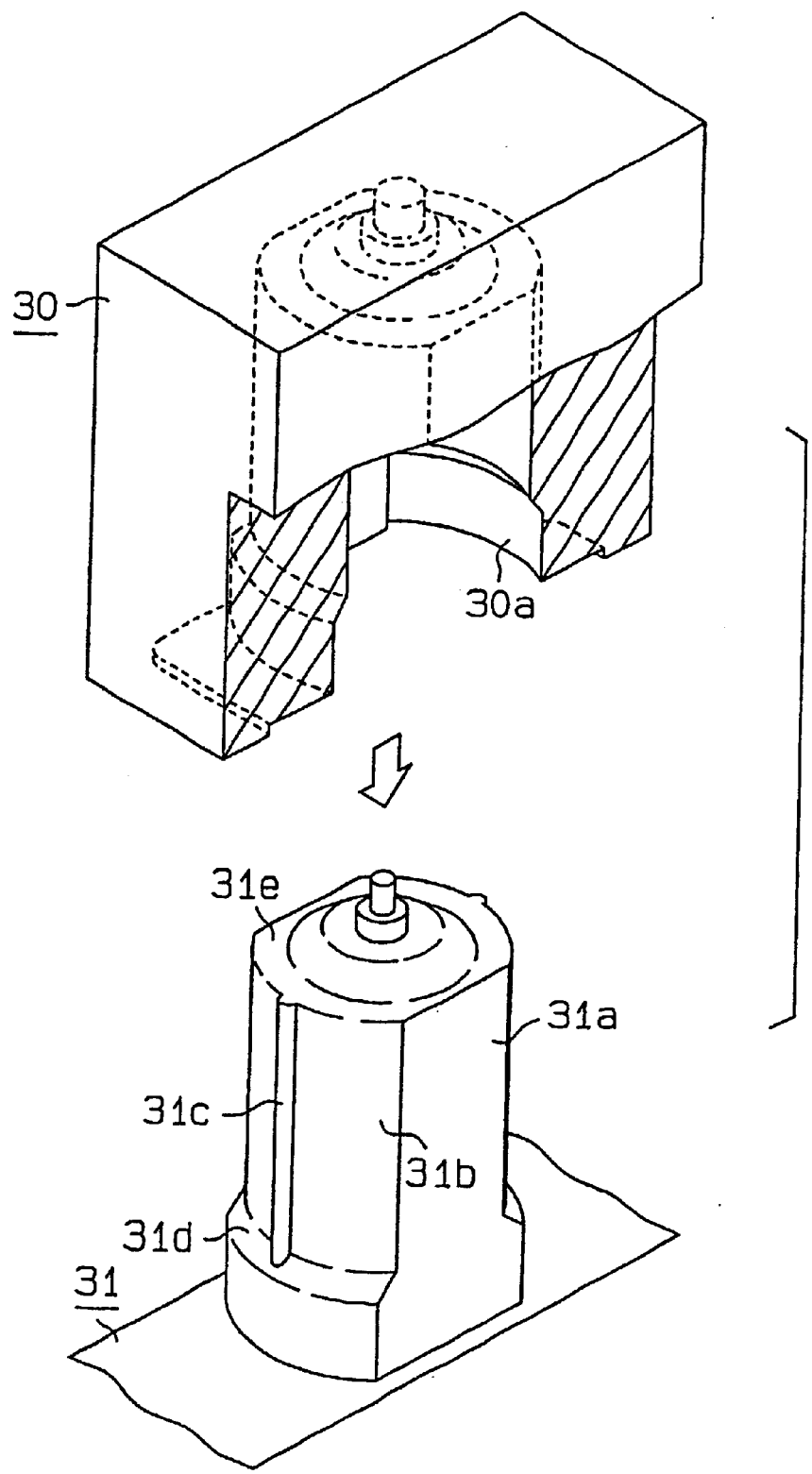
FIG. 12 is a perspective view of dies used in press working of the yoke housing according to the second embodiment.

The yoke housing 4 having the reduced thickness portions 4g is formed by press working of the plate material in a press machine (not shown) having a pair of upper and lower dies 30, 31 shown in FIG. 12. These dies 30 and 31 are substantially similar to those of the first embodiment shown in FIG. 6.

Specifically, the upper die 30 includes an outer surface shaping recess 30a for shaping the outer surface of the yoke housing 4. The lower die 31 includes an inner surface shaping protrusion 31a for shaping the inner surface of the yoke housing 4. The inner surface shaping protrusion 31a includes arcuate section shaping surfaces 31b for shaping the arcuate sections 4b of the yoke housing 4. Furthermore, in a circumferential center of each arcuate section shaping surface 31b, there is formed a reduced thickness portion shaping protrusion 31c for shaping the corresponding reduced thickness portion 4g by recessing the corresponding portion of the inner surface of the arcuate section 4b. The reduced thickness portion shaping protrusion 31c extends linearly along the arcuate section shaping surface 31b in the axial direction between a step portion shaping surface 31d side end and a base section shaping surface 31e side end.

When the upper die 30 is pressed against the lower die 31 with a predetermined pressure, the inner and outer surfaces of the yoke housing 4 are formed or shaped, and the reduced thickness portions 4g are also simultaneously formed to extend linearly from the step portion 4e in the axial direction, as shown in FIG. 11.

In other words, the yoke housing 4 is formed such that each reduced thickness portion 4g extends continuously from the step portion 4e. That is, each reduced thickness portion 4g axially extends from a step portion 4e side end of the inner surface of the corresponding arcuate section 4b, so that the recess of the reduced thickness portion 4g is visible from one side (top side in FIG. 11) of the axial direction. As a result, similar to the first embodiment, each reduced thickness portion 4g can be simultaneously formed together with the outer and inner surfaces of the yoke housing 4 using the above-described dies 30 and 31. Thus, in accordance with the present embodiment, there is no need to provide a specialized separate manufacturing step or a specialized separate die to form only the reduced thickness portions 4g, and it is only additionally required to provide the reduced thickness portion shaping protrusions 31c in the lower die 31. Since the reduced thickness portions 4g are formed by the simple axial movement of the upper die 30, the control operation of the press machine is not complicated, and the entire press working time is not increased.

Furthermore, with reference to FIGS. 8 and 9, similar to the first embodiment, when the wall thickness t' of the reduced thickness portion 4g formed in each arcuate section 4b is equal to or less than 40% of the wall thickness T' of each flat section 4a, the magnetic flux density in the commutating zone X can be substantially reduced.

The above described embodiments can be modified as follows.

In the above embodiments, only one of the outer and inner surfaces of the yoke housing 4 is recessed to provide each reduced thickness portion 4f. Alternatively, each reduced thickness portion can be formed by recessing both the outer and inner surfaces of the yoke housing 4.

In the above embodiments, the circumferential width of the reduced thickness portion 4f is selected based on the size of the motor main body 2. Alternatively, the circumferential width of the reduced thickness portion 4f can be selected based on any other appropriate factor. That is, as long as the effective magnetic flux of the motor main body 2 is not substantially reduced, and the output of the motor main body 2 is not substantially influenced, the circumferential width of the reduced thickness portion can be any size.

Figure 13:
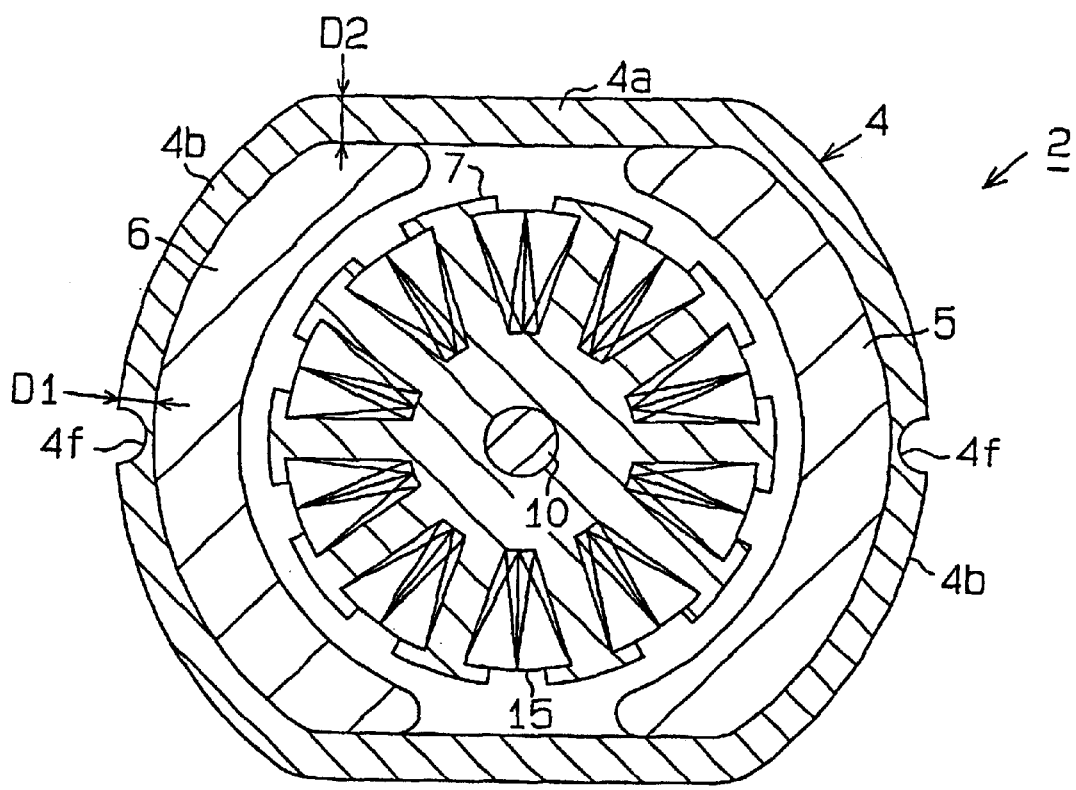
FIG. 13 is a cross-sectional view showing a modification of the yoke housing.

In the above embodiments, the wall thickness of each flat section 4a is substantially the same as that of the arcuate section 4b. Alternatively, the wall thickness of each flat section 4a can be larger than that of the arcuate section 4b. For instance, as shown in FIG. 13, the wall thickness of each arcuate section 4b can be gradually increased from D1 at a circumferential center thereof to D2 at each circumferential end thereof, and the wall thickness of each flat section 4a can be D2 throughout it. That is, since the magnetic flux Φ1 that passes through each arcuate section 4b increases gradually from the circumferential center thereof toward each circumferential end thereof (toward the flat section 4a), the shape of the arcuate section 4b is selected to conform with this phenomenon. In this way, an increase in the magnetic resistance is restrained, and also the wall of the yoke housing 4 has a minimum amount of excessive wall thickness. Thus, the size and the weight of the motor 1 (motor main body 2) can be minimized, and also the output of the motor 1 (motor main body 2) can be increased.

Furthermore, although it is not depicted, the wall thickness of each arcuate section 4b can be D1 throughout it, and the wall thickness of each flat section 4a can be D2 throughout it. In this arrangement, since the magnetic flux Φ1 that passes through each flat section 4a is greater than the magnetic flux Φ1 that passes through each arcuate section 4b, an increase in the magnetic resistance is restrained, and also the wall of the yoke housing 4 has a minimum amount of excessive wall thickness. Thus, the size and the weight of the motor 1 (motor main body 2) can be minimized, and also the output of the motor 1 (motor main body 2) can be increased.

In the above embodiments, the present invention is embodied in the generally oblate cylindrical yoke housing 4. However, the present invention can be alternatively embodied in a cylindrical yoke housing.

Furthermore, in the above embodiments, each permanent magnet 5 or 6 extends linearly in the axial direction. However, each permanent magnet may be skewed with respect to the axial direction of the yoke housing 4 to achieve skewing effect. In this case, each reduced thickness portion 4f does not extend linearly in the axial direction of the yoke housing 4 but is skewed to extend along a center line of the corresponding skewed permanent magnet.

Also, in the above embodiments, the permanent magnets 5 and 6 are used as the primary magnetic poles. Alternatively, electromagnetic coils can be used to form the primary magnetic poles.

Furthermore, in the above embodiments, the upper die 30 is pressed against the lower die 31. Alternatively, the lower die 31 can be pressed against the upper die 30.

Additional advantages and modifications will readily occur to those skilled in the art. The invention in its broader terms is therefore, not limited to the specific details, representative apparatus, and illustrative examples shown and described.

What is claimed is:

1. A direct current motor comprising a yoke housing and an armature rotatably received within said yoke housing, said yoke housing including:
    a plurality of primary magnetic poles secured to an inner peripheral surface of said yoke housing for providing magnetic fields to said armature; and
    a plurality of groove-like reduced thickness portions for increasing a magnetic resistance, said plurality of groove-like reduced thickness portions being integrally formed in said yoke housing, wherein:
        a number of said plurality of groove-like reduced thickness portions is equal to a number of said plurality of primary magnetic poles; and
        each said groove-like reduced thickness portion extends along a center line of a corresponding one of said plurality of primary magnetic poles and has an uncovered outer surface on an outside of said yoke housing to expose said entire outer surface of said groove-like reduced thickness portion to air.

2. A direct current motor according to claim 1, wherein each said groove-like reduced thickness portion is recessed in one of an outer peripheral surface and said inner peripheral surface of said yoke housing.

3. A direct current motor according to claim 1, wherein each said primary magnetic pole is configured such that said center line of each said primary magnetic pole extends linearly in an axial direction of said yoke housing.

4. A direct current motor according to claim 1, wherein each said groove-like reduced thickness portion extends from one of opposing axial ends of said yoke housing for a length that covers an entire axial length of said corresponding one of said plurality of primary magnetic poles.

5. A direct current motor according to claim 1, wherein:
said yoke housing is formed as a generally oblate cylinder that includes opposing generally parallel flat sections and opposing arcuate sections; and
each said arcuate section has one of said plurality of primary magnetic poles secured to an inner peripheral surface of each said arcuate section.

6. A direct current motor according to claim 5, wherein said yoke housing is configured such that a wall thickness of each said flat section is larger than a wall thickness of each said arcuate section.

7. A direct current motor according to claim 5, wherein said wall thickness of each said arcuate section gradually increases from a circumferential center of each said arcuate section toward each one of opposing circumferential ends of each said arcuate section.

8. A direct current motor according to claim 1, wherein said plurality of primary magnetic poles include permanent magnets.

9. A direct current motor according to claim 5, wherein a wall thickness of each said groove-like reduced thickness portion is equal to or less than 40% of a wall thickness of each said flat section.

10. A yoke housing of a direct current motor that includes an armature rotatably received within said yoke housing, said yoke housing comprising:
a plurality of primary magnetic poles secured to an inner peripheral surface of said yoke housing for providing magnetic fields to said armature; and
a plurality of groove-like reduced thickness portions for increasing a magnetic resistance, said plurality of groove-like reduced thickness portions being integrally formed in said yoke housing, wherein:
a number of said plurality of groove-like reduced thickness portions is equal to a number of said plurality of primary magnetic poles; and
each said groove-like reduced thickness portion extends along a center line of a corresponding one of said plurality of primary magnetic poles and has an uncovered outer surface on an outside of said yoke housing to expose said entire outer surface of said groove-like reduced thickness portion to air.

11. A direct current motor according to claim 1, wherein an axial extent of each groove-like reduced thickness portion is greater than an axial extent of any of said primary magnetic poles.

12. A direct current motor according to claim 1, wherein each groove-like reduced thickness portion has a curved concave surface.

13. A yoke housing according to claim 10, wherein each groove-like reduced thickness portion has a curved concave surface.

14. A direct current motor comprising a yoke housing, which has a closed end and an open end, an armature rotatably received within said yoke housing, and a gear housing secured to said open end of said yoke housing such that a substantially closed space is formed in said yoke housing, said yoke housing including:
a plurality of primary magnetic poles secured to an inner peripheral surface of said yoke housing for providing magnetic fields to said armature; and
a plurality of groove-like reduced thickness portions for increasing a magnetic resistance, said plurality of groove-like reduced thickness portions being integrally formed in said yoke housing, wherein:
a number of said plurality of groove-like reduced thickness portions is equal to a number of said plurality of primary magnetic poles; and
each said groove-like reduced thickness portion extends along a center line of a corresponding one of said plurality of primary magnetic poles and has an uncovered outer surface on an outside of said yoke housing to expose said entire outer surface of said groove-like reduced thickness portion to air.

15. A direct current motor according to claim 14 wherein each groove-like reduced thickness portion has a curved concave surface.

16. A direct current motor comprising a yoke housing, which has a closed end and an open end, and an armature rotatably received within said yoke housing, said yoke housing including:
a plurality of primary magnetic poles secured to an inner peripheral surface of said yok housing for providing magnetic fields to said armature; and
a plurality of groove-like reduced thickness portions for increasing a magnetic resistance, said plurality of groove-like reduced thickness portions being integrally formed in said yoke housing such that one aid of each groove-like reduced thickness portion is located in one of said closed end and said open end of said yoke housing, wherein:
a number of said plurality of groove-like reduced thickness portions is equal to a number of said plurality of primary magnetic poles; and
each said groove-like reduced thickness portion extends along a center line of a corresponding one of said plurality of primary magnetic poles and has an uncovered outer surface on an outside of said yoke housing to expose said entire outer surface of said groove-like reduced thickness portion to air.

17. A direct current motor according to claim 16, wherein the other end of each groove-like reduced thickness portion is positioned away from the other one of said closed end and said open end of said yoke housing.

18. A direct current motor according to claim 16, wherein each groove-like reduced thickness portion has a curved concave surface.

19. A direct current motor according to claim 16, wherein each groove-like reduced thickness portion has a high-magnetic resistance to thereby reduce magnetic flux induced by an armature magnetomotive force.

20. A direct current motor according to claim 14, wherein each groove-like reduced thickness portion has a high-magnetic resistance to thereby reduce magnetic flux induced by an armature magnetomotive force.

21. A direct current motor according to claim 10, wherein each groove-like reduced thickness portion has a high-magnetic resistance to thereby reduce magnetic flux induced by an armature magnetomotive force.

22. A direct current motor according to claim 1, wherein each groove-like reduced thickness portion has a high-magnetic resistance to thereby reduce magnetic flux induced by an armature magnetomotive force.

* * * * *